United States Patent
Nieberl et al.

(10) Patent No.: US 12,543,987 B2
(45) Date of Patent: Feb. 10, 2026

(54) WEARABLE MONITORING DEVICE WITH INTELLIGENT MEASURING HEAD

(71) Applicants: Jozsef Nieberl, Folsom, CA (US); Huba Horompoly, Folsom, CA (US)

(72) Inventors: Jozsef Nieberl, Folsom, CA (US); Huba Horompoly, Folsom, CA (US)

(*) Notice: Subject to any disclaimer, the term of this patent is extended or adjusted under 35 U.S.C. 154(b) by 331 days.

(21) Appl. No.: 18/092,651

(22) Filed: Jan. 3, 2023

(65) Prior Publication Data

US 2024/0215888 A1  Jul. 4, 2024

(51) Int. Cl.

| | |
|---|---|
| *A61B 5/0205* | (2006.01) |
| *A61B 5/00* | (2006.01) |
| *A61B 5/021* | (2006.01) |
| *A61B 5/1455* | (2006.01) |
| *A61B 5/254* | (2021.01) |
| *A61B 5/256* | (2021.01) |
| *A61B 5/28* | (2021.01) |

(52) U.S. Cl.
CPC ............ *A61B 5/256* (2021.01); *A61B 5/0205* (2013.01); *A61B 5/02108* (2013.01); *A61B 5/14551* (2013.01); *A61B 5/254* (2021.01); *A61B 5/28* (2021.01); *A61B 5/6824* (2013.01); *A61B 2560/0443* (2013.01); *A61B 2562/0214* (2013.01)

(58) Field of Classification Search
CPC .............................. A61B 5/02055; A61B 5/305
USPC .......................................................... 600/301
See application file for complete search history.

(56) References Cited

U.S. PATENT DOCUMENTS

2010/0076331 A1* 3/2010 Chan ...................... A61B 5/681
                                                                    600/509

* cited by examiner

*Primary Examiner* — Nadia A Mahmood
(74) *Attorney, Agent, or Firm* — The Rapacke Law Group, P.A.; Andrew S. Rapacke

(57) ABSTRACT

A cordless, wireless system for providing the long-term collection of medical data that may be used in digital ECG analysis, that includes a retaining element that retains a sensor in close proximity or adjacent to a user's skin and an intelligent measuring head that obtains the information provided by the sensor and transmits the obtained information to a processing system. The processing system collates the obtained information and determines from the collated data a digital ECG response and further a blood pressure based on blood oxygenation level.

20 Claims, 9 Drawing Sheets

WEARABLE MONITORING DEVICE WITH INTELLIGENT MEASURING HEAD

TECHNICAL FIELD

The embodiments presented relate to medical devices and, more specifically, to cordless medical devices for the measurement of biological data.

BACKGROUND

Advances in medical science continue to provide benefits to the human population in the ability to measure body functions that may be used to predict the potential risks to the patient. Measurements, such as blood pressure, oxygenation levels and heart rhythms, are typically used in evaluating the health condition of a patient and accessing whether risks, associated with the heart, are present.

Electrocardiogram (ECG or EKG) is a well-known procedure used by medical professionals (i.e., doctors, nurses, medical technicians) in determining operational characteristics of a patient's heart. The measured characteristics may then be used to determine, and uncover, potential risks to a patient.

Traditionally, analog ECG measurements have been used to record, on a moving page, electrical representations or impulses associated with the biological data detected by sensors that are attached to known points on the patient's body.

Conventional analog electrocardiograms utilize strip sensors placed at different points on a patient's body to monitor the electrical activity at these points. Typically, a conductive gel or adhesive is used to provide a good galvanic skin-electrode contact between the patient's skin and the sensor. Furthermore, wires are connected to each of the sensors to record the electrical representations of the biological data detected by the sensors.

Digital ECGs have replaced analog ECGs in many instances. Smartwatches and other types of consumer based digital ECG system have recently been introduced onto the market that advertise the performance of a digital ECG (or EKG) data by a user. For example, smart watches may perform a digital ECG by the using holding a metal portion of the watch case while a second metal element of the watch case is in contact with the user's skin. Similarly, consumer applicable digital ECG devices required the user place their fingers on a metallic element, which records biological data. For both the smartwatch and the consumer digital ECG systems, the collected data may be presented on a smart phone (e.g., Apple iPhone).

However, there are many disadvantages to the conventional electrocardiograms. First, it is not possible to obtain a long-term (i.e., several hours, days, months) ECG measurement as long-term contact of the sensors with the skin may lead to skin redness or an allergic reaction of the metallic elements of the adhesive. In addition, the wired connector prevents the patient from moving about.

In addition these measurements are neither automatically nor continuously performed.

Hence, there is a need in the industry for a method of performing automatic and continuous measurements that may be used in the long-term monitoring of a user or patient's health.

SUMMARY OF THE INVENTION

The embodiments disclose a wearable device for the collection of biological data used in performing an electrocardiogram. The wearable device comprises a sensor held in contact with a user by a retaining element and a monitoring system that transmits the data detected by the sensor to a processing system configured to perform mathematical calculations resulting in a digital electrocardiogram.

A wearable device is disclosed, herein, that provides for the long-term collection of biological data used in the performance of an electrocardiogram data, wherein a sensing element is held in place proximate to the user by a pressure applied by the wearable device.

A wearable device is disclosed, herein, that provides for the long-term collection of biological data that may be used to monitor changes in biological data over an extended period of time.

In one aspect, the wearable device includes a retaining element that is expandable and retractable in the form of a clip, a tong and a wrap.

In one aspect, the wearable device may include a capacitive sensor that measures biological data by a change in capacitance.

In one aspect, the wearable device comprises an intelligent measuring head that is removably attachable to the retaining element.

In one aspect, the intelligent measuring head comprises circuitry that digitizes the collected biological data and transmits the digitized data to a processing system.

In one aspect, the data is transmitted to the processing system using one of a wireless system.

In one aspect, the wireless system is one of: middle range communication system (e.g., BLUETOOTH), a local area network system (e.g., Wi-Fi) and a global network (e.g., cellular).

BRIEF DESCRIPTION OF THE DRAWINGS

A complete understanding of the embodiments and the advantages and features thereof will be readily understood by reference to the following detailed description when considered in conjunction with the accompanying drawings wherein.

DETAILED DESCRIPTION

The specific details of the single embodiment or variety of embodiments described herein are set forth in this application. Any specific details of the embodiments are used for demonstration purposes only, and no limitations, or inferences, as to the scope of the invention claimed are to be understood therefrom. It is noted that the embodiments reside primarily in combinations of components related to the system and method of use thereof.

The present embodiments are based in part on the ability of measurement sensors to be attached to the patient over a long-term, wherein the biological information provided by the sensors may be wireless transmitted to a central service, through a BLUETOOTH technology, a Wi-Fi technology, and/or a cellular technology.

Figure 1:
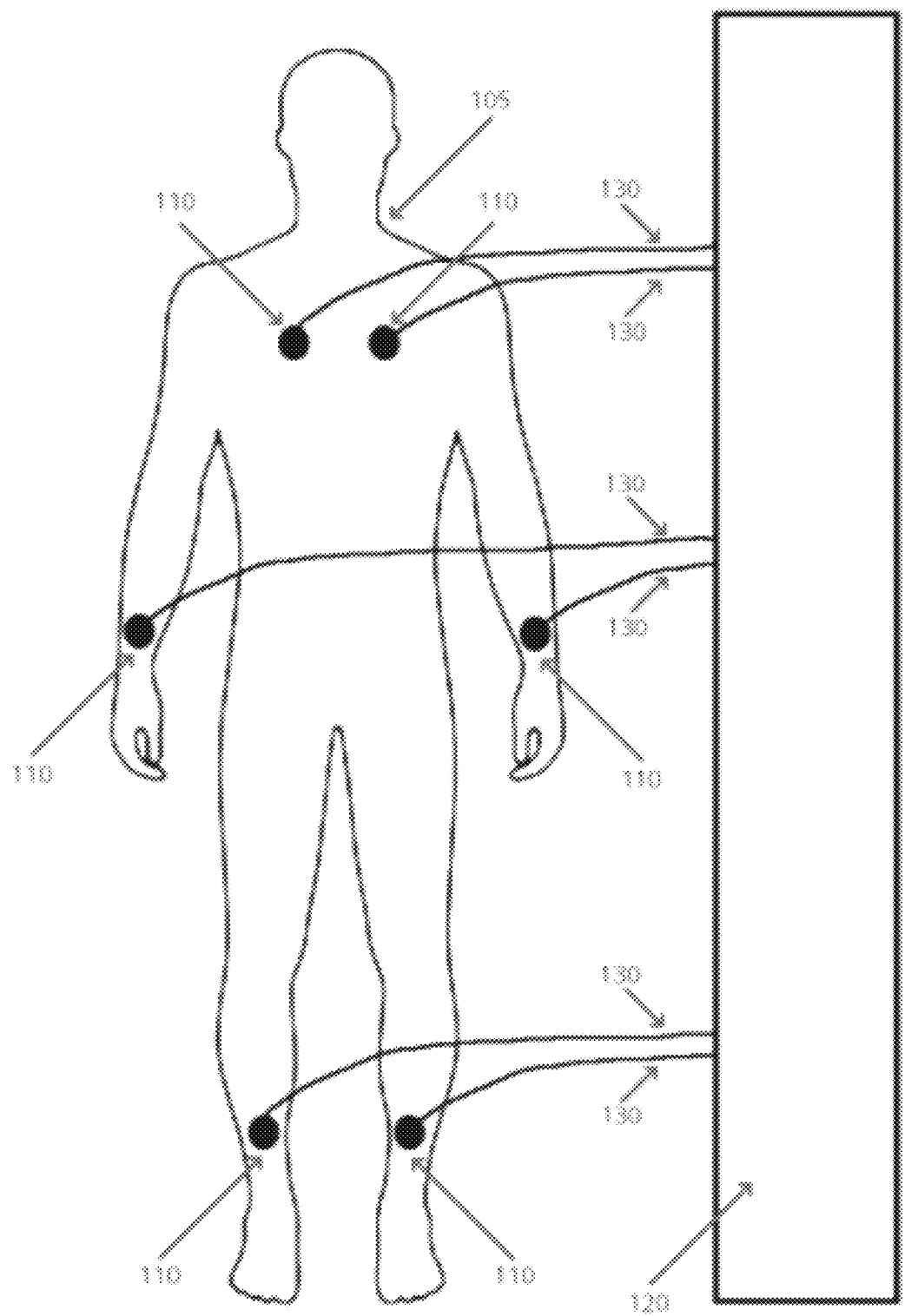
FIG. 1 illustrates a perspective view of a conventional ECG system.

FIG. 1 illustrates a conventional ECG system wherein electrical contacts 110 are attached to the body of a patient or a user 105 at selected points on the body. A six (6) contact point system is shown, but it would be recognized that the number of electrical contacts may be increased to obtain additional measurements. Each of the electrical contacts 110 is connected by a wired connection 130 to a strip chart record 120, which presents the detected electrical representations (e.g., impulses) of the biological data associated with each of the measurement points.

Figure 2:
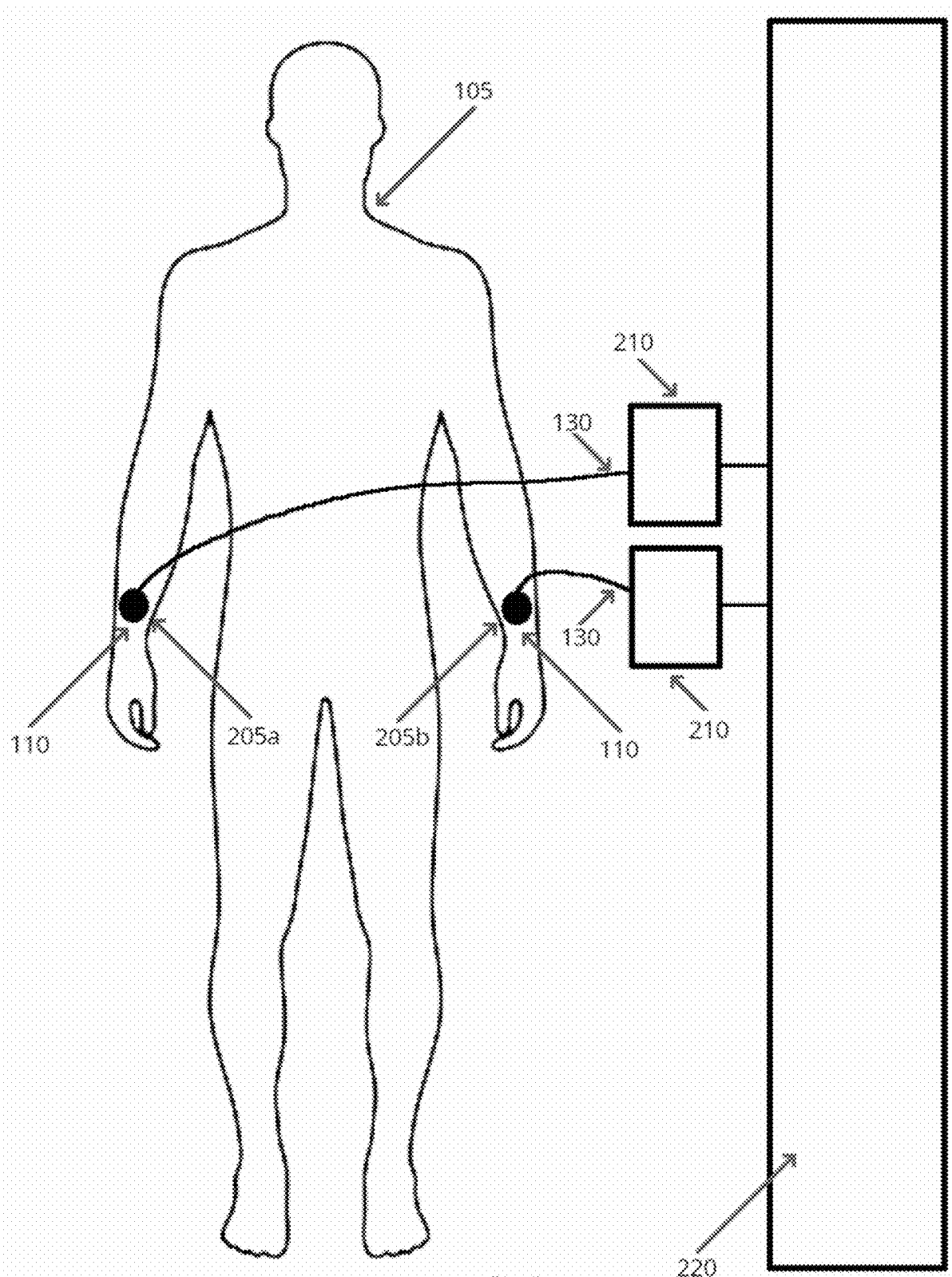
FIG. 2 illustrates a perspective view of a conventional digital ECG system.

FIG. 2 illustrates a conventional digital ECG system, wherein electrical contacts 110 are attached to the body of a patient or user 105 at, in this illustrated example, two (2) selected pointed on the body; right wrist 205a and left wrist 205b. In addition, the illustrated electrical contacts are connected to Analog-to-Digital (ADC) converters 210, which in this illustrated example is through a wired connection 130. The detected biological data obtained from the sensors 110 is digitized and presented to a computing system 220 that renders the smart phone a special purpose device, etc., suitable for displaying the resultant digital ECG. In one aspect computing system 220 may be one of a microprocessor, a general-purpose computing system including software or instruction that when executed render the general-purpose computing system a special purpose computing system, a smart phone with software or instruction (i.e., an application), In addition, computing system 220 may further be referred to as a "cloud-based" processing system that stores the collected information on one or more data storage systems that may be accessed by one or more computing systems 220.

Computing system 220 processes the digitized signals (VL+Noise) obtained from the electrical connection attached to the illustrated left wrist 205b and the signals (VR+Noise) obtained from the electrical connection attached to the illustrated right wrist 205a using known mathematical operations and algorithms to compute a digital ECG and, thus, provide an assessment of condition of a patient's heart.

The mathematical operations and algorithms needed to compute the digital ECG from the obtained biological data are well-known in the art and, a detailed explanation of the mathematics or algorithms required to compute the digital ECG are, thus, not believed necessary in the understanding of the invention claimed, herein. The resultant information regarding the ECG determination may then be presented on a display, for example.

Figure 3:
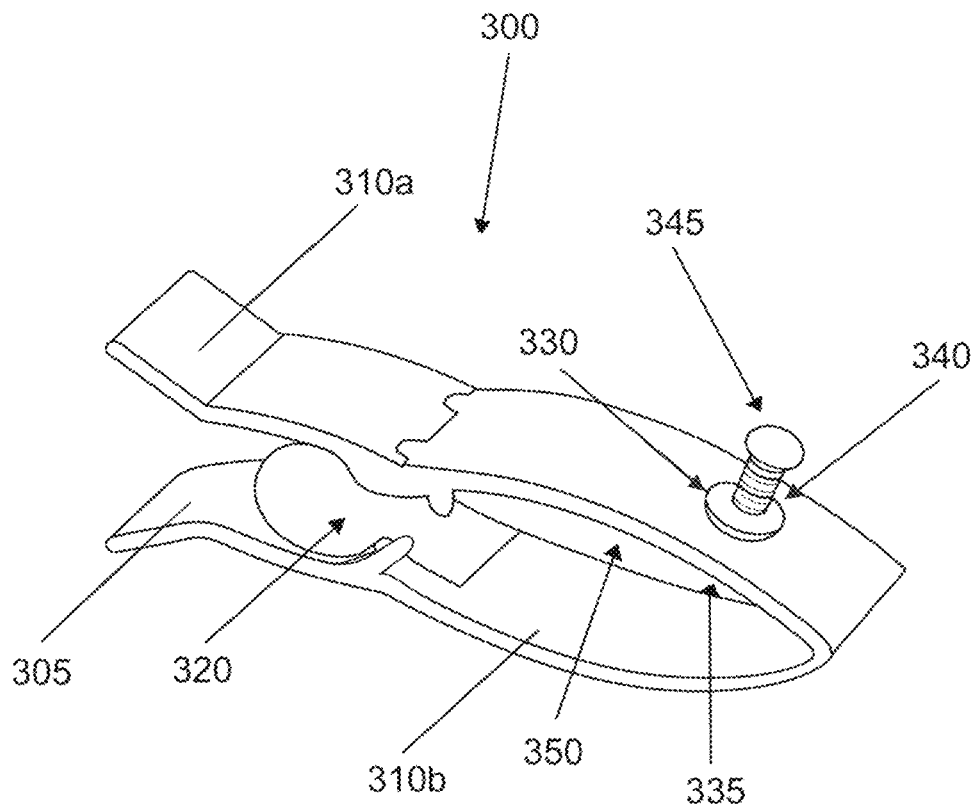
FIG. 3 illustrates an exemplary embodiment of a wearable device in accordance with the principles of the invention.

FIG. 3 illustrates an exemplary embodiment of a wearable device in accordance with the principles of the invention.

In this illustrated exemplary embodiment wearable device 300 comprises a retaining element 305 comprising an upper arm 310a and a lower arm 310b and a spring type clip 320 positioned between upper arm 310a and lower arm 310b and a means for transferring information to a computation/recording mechanism. In accordance with the principles of the invention, wearable device 300, as represented by retaining element 305, allows for the retention onto a body part (e.g., a wrist) the ability to expand and retract.

Spring clip 320 retains retaining element 305 in a normally closed position and allows for the separation of upper arm 310a and lower arm 310b to expand an area 350 between upper arm 310a and lower arm 310b. Into the expanded area 350 may be inserted a body part, wherein spring clip 320 further provides a force to upper arm 310a and lower arm 310b to return upper arm 310a and lower arm 310b to the normally closed, initial, position and, thus, the inserted body part is retained by wearable device 300.

Further illustrated is contact area or tab 330 attached to, in this illustrated example, an upper surface of upper arm 310a. In addition, a sensor element 335 (not explicitly shown) suitable for detecting biological, and changes in biological, data is attached to a lower surface of upper arm 310a, wherein sensor element 335 is in electrical contact with contact area 330. In one aspect of the invention, sensor 335 may represent a conventional strip type electrical electrode that is held in contact with a patient's skin to record biological data in the form of electrical impulses. In another aspect of the invention, sensor 335 may represent a capacitive electrode held in contact with a patient's skin, wherein changes in the capacitance in the patient's skin are used to record biological data. The use of a capacitive electrode sensor 335 is advantageous as it improves the wearability of wearable device 300 as the risk of skin rash or allegoric reaction is reduced.

In one aspect of the invention, contact post 340/345 electrically connected contact tab 330. Contact post 340/345 provides a means for the transfer of electrical impulses detected by sensor 335.

Although wearable device 300 is shown in the form of an expandable/retractable clip or tong, it would be recognized that wearable device 300 may be in the form of an expandable band that may be expanded and retracted to firmly retain sensor 335 proximate or in contact with a body part. In still another aspect of the invention, wearable device 300 may comprise a material that may be wrapped around a body part where the material includes known attachment schemes to retain sensor 335 adjacent to an enclosed body part.

Figure 4:
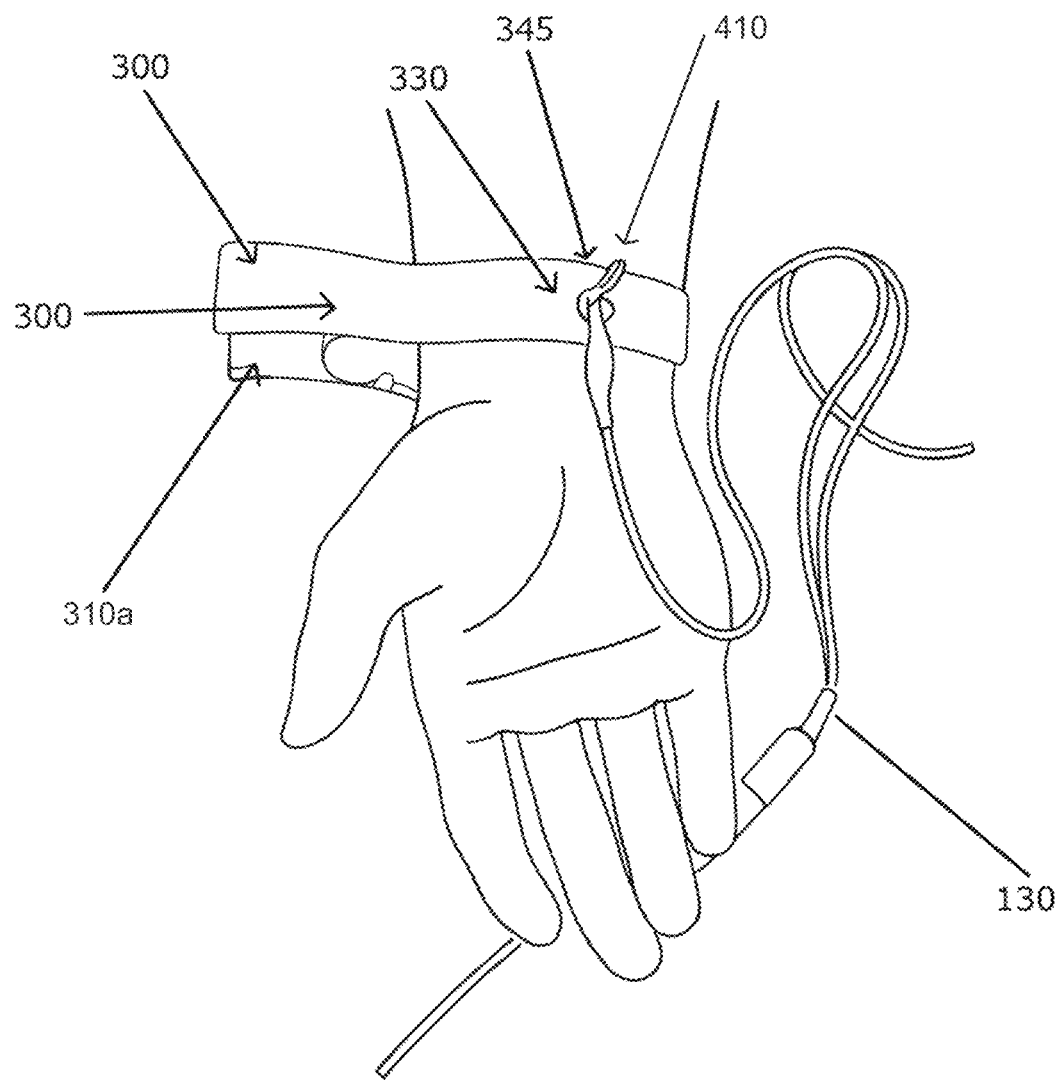
FIG. 4 illustrates an exemplary application of the wearable device shown in FIG. 3.

FIG. 4 illustrates an exemplary application of the wearable device 300 shown in FIG. 3. In this exemplary application, a user's wrist 410 is shown retained by wearable device 300. In this illustrated application, upper arm 310a is shown proximate to the lower side of user wrist 410 and sensor 335, (not shown) is in contact with a patient's skin positioned between the Ulnar (pinky finger side) and Radial (thumb side) bones (not shown) within the wrist.

Further illustrated is "alligator clip" 420 connected to contact post 340/345, wherein electrical impulses associated with biological data detected by sensor 335 are transferred to a calculation/recording system. In this illustrated case, the electrical impulses associated with the detected biological data are transferred through the attached wire element 130 in a manner similar to a conventional ECG.

Figure 5:
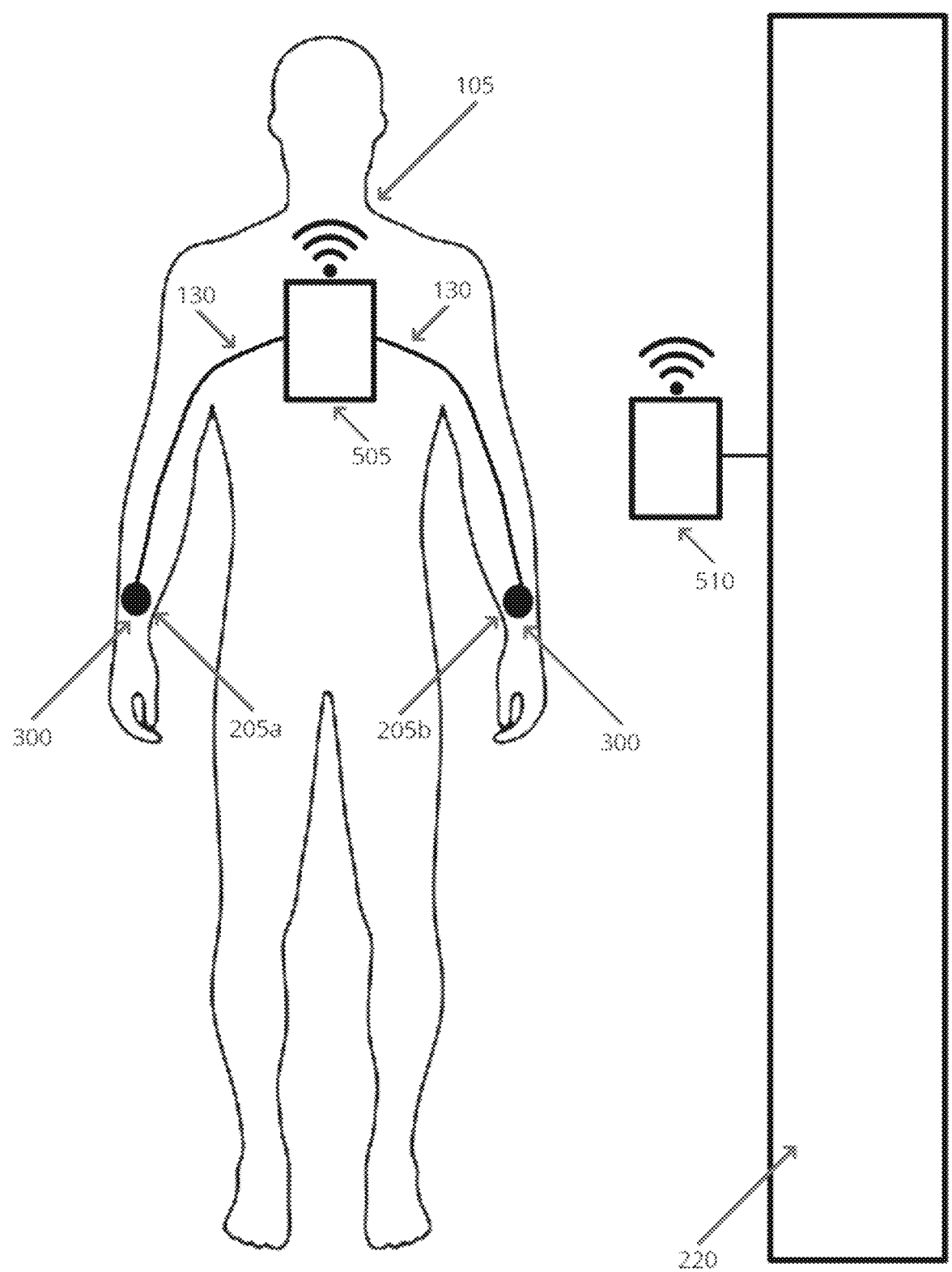
FIG. 5 illustrates a first exemplary application of the wearable device comprising the features shown in FIGS. 3 and 4.

FIG. 5 illustrates a first exemplary application of a wearable device comprising the features shown in FIGS. 3 and 4 in accordance with the principles of the invention.

In this illustrated application, a wearable device 300 is attached to both right wrist 205a and left wrist 205b, wherein corresponding sensors 335 (not shown) detect biological data associated with the right side and left side of a user. Electrical signal detected by left side wearable device 300 and right-side wearable device 300 are provided, in this case, through a wired connection (i.e., wires 130) to a processor/transmitter 505. Processor/transmitter 505 including an Analog/Digital converter (ADC) to convert the received electrical biometric signals into digital signals, transmits the digitized biometrical information to receivers 510, which provide corresponding information (i.e., left information and right information) to computing system 220.

In one aspect of the invention, processor/transmitter 505 may communicate with receiver 510 through one or more well-known communication protocols. For example, BLUETOOTH for middle range communication (approximately 30 feet), Wi-Fi for a local area network, and cellular for a global network.

Figure 6:
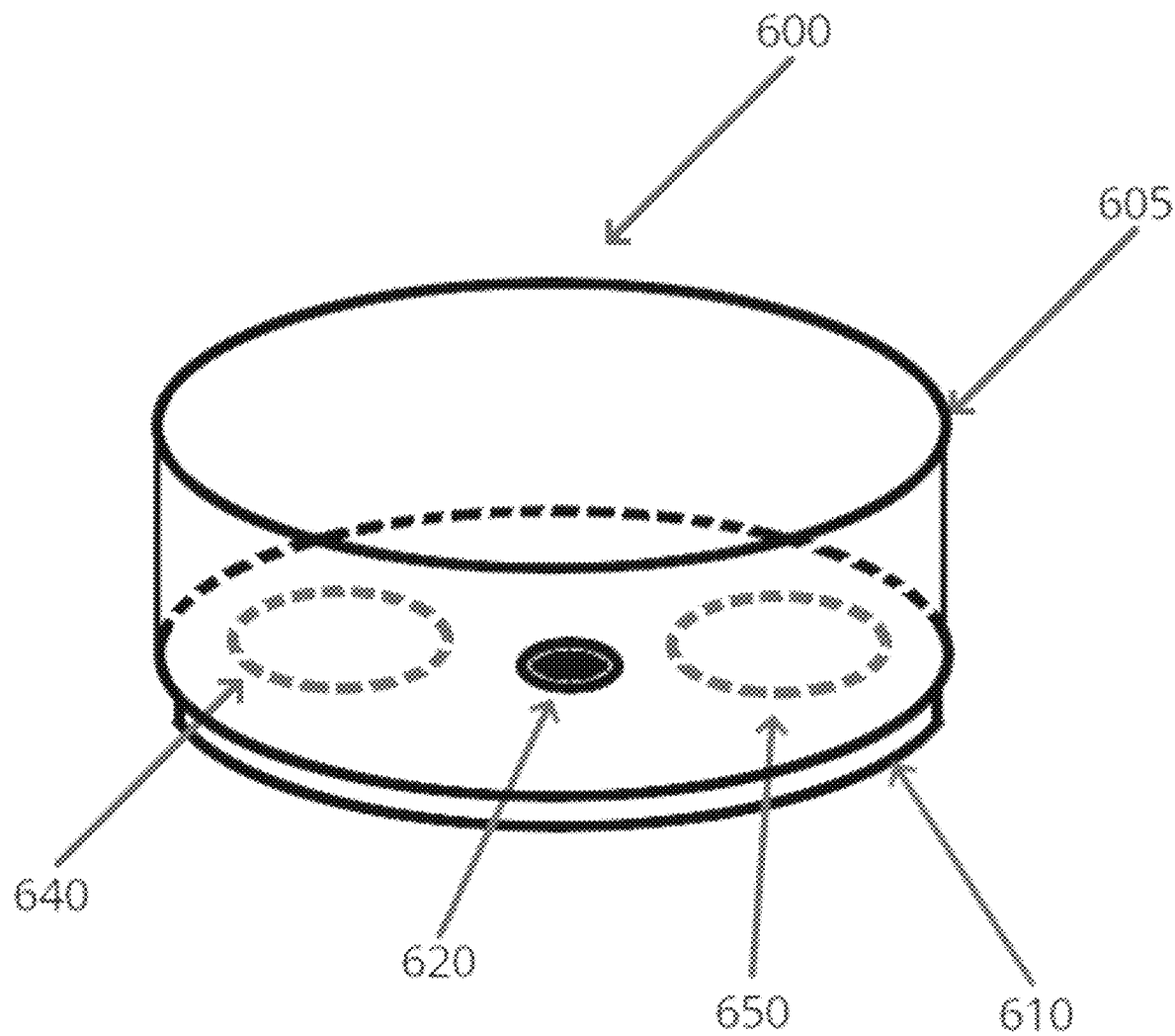
FIG. 6 illustrates an exemplary embodiment of an intelligent measuring head in accordance with the principles of the invention.

FIG. 6 illustrates an exemplary embodiment of an intelligent measuring head or module in accordance with the principles of the invention.

In this illustrated embodiment, transmitter/processor 505, in the form of intelligent measuring head 600, comprises a housing 605 into which is contained transmitting/receiving equipment 640 and electrical circuitry 650. Transmitting/receiving equipment 640 may provide for one of: a BLUETOOTH communication, a Wi-Fi communication and/or a cellular communication. Electrical circuitry 650 includes well-known electrical/electronic components, such as resistors, transistors, integrated circuitry, application specific integrated circuits (ASICs), etc., that process the data collected by sensor 335. Electrical circuitry 650 may further include ADC 210 to digitize the received electrical impulses associated with the detected biological data.

In this illustrated embodiment, housing 605 further includes a base element 610 that provides for the removable attachment of housing 605 with regard to retaining element 305 and contact area 330. In one aspect of the invention, base 610 may comprise a flexible material that forms a vacuum connection between housing 605 and retaining element 305. In another aspect of the invention, base 610 may comprise a magnetic element that forms a magnetic connection of housing 605 to retaining element 305. In addition, base 610 provides for an electrical connection between contact tab 330 and the transmitting/receiving equipment 640 within housing 605. Accordingly, data detected by sensor 335 may be transferred to intelligent measuring head 600 for subsequent transmission to a computing system 220, as previously discussed. In one aspect of the invention, electrical impulses associated with the biological data detected by sensor 335 may be inductively transferred to intelligent measuring head 600.

In another aspect of the invention, intelligent measuring head 600 may include an opening 620 into which contact post 340/345 may be inserted when intelligent measuring head 600 is utilized with wearable device 300. Accordingly, intelligent measuring head 600 may be attached to retaining element 305 through post 340/345, wherein electrical impulses associated with biological data detected by sensor 335 are transferred through post 340/345 to intelligent measuring head 600 for subsequent transmission to a computing device 220.

Figure 7:
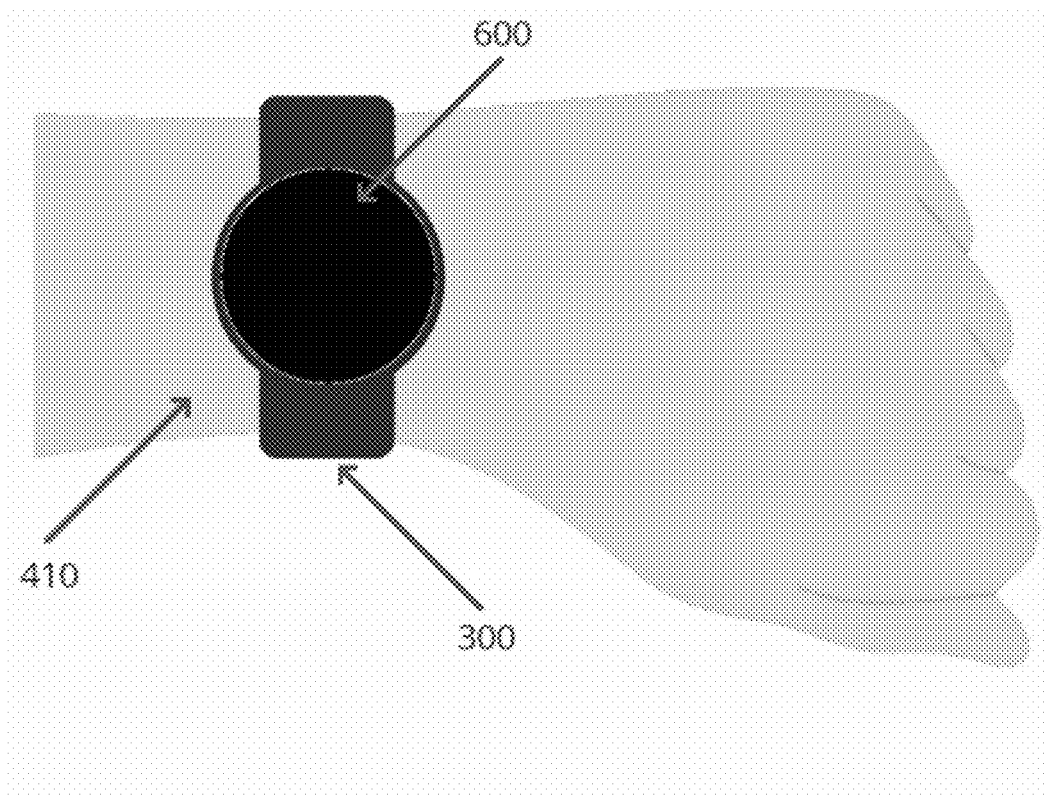
FIG. 7 illustrates an exemplary embodiment of a wearable device comprising the feature disclosed in FIGS. 3 and 6.

FIG. 7 illustrates an exemplary embodiment of a wearable device comprising the feature disclosed in FIGS. 3 and 6.

In this illustrated application wearable device 300 is attached to a user's wrist 410 by retaining element 305, in the form of a wrist band, wherein intelligent measuring head 600 is attached to retaining element 305. Sensor 335 (not shown) in this illustrated example, is held in contact with a user's skin by retaining element 305. In one aspect of the invention, intelligent measuring head 600 may be magnetically attached to retainer element 305 by the attraction of magnetic plate 610 with contact area 330. In another aspect of the invention, intelligent measuring head 600 may be attached to retaining element 305 by the engagement of post 340/345 with passage 620.

In this illustrated example, intelligent measuring head 600 provides information collected by sensor 335 (not shown) directly to a processor/transmitter similar to that shown in FIG. 5, for example, without the use of a wired connection to provide a single source of data to computing system 220. Alternatively, each intelligent measuring head 600 associated with left wrist 205*b* and right wrist 205*a* may provide information collected by a corresponding sensor 335 directly to computing system 220. In one aspect, intelligent measuring heads 600 may transmit an identification code that identifies the information received as being from intelligent measuring head 600 associated with left wrist 205*b* or right wrist 205*a*.

Figure 8:
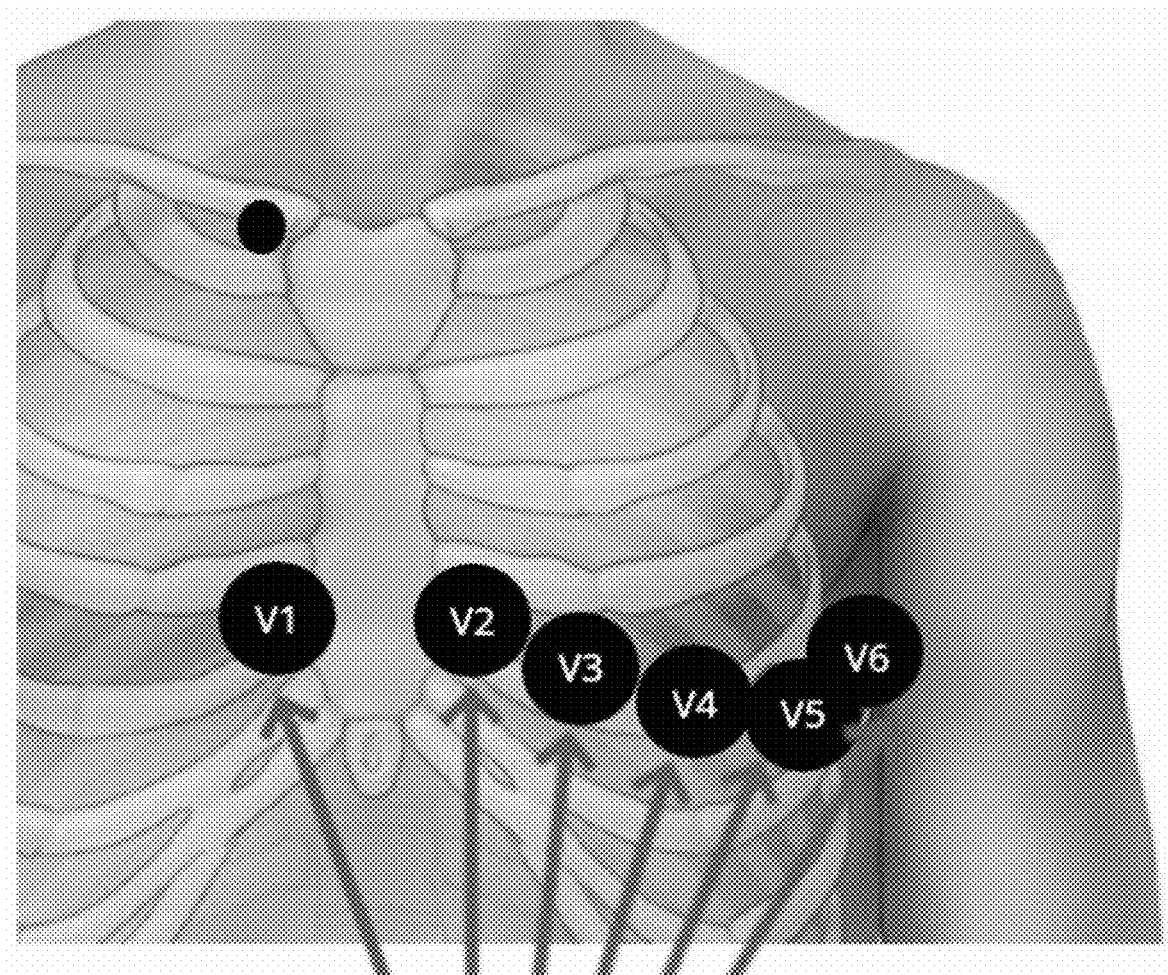
FIG. 8 illustrates an exemplary embodiment of a digital ECG system utilizing the wearable device disclosed herein.

FIG. 8 illustrates an exemplary embodiment of a digital ECG system, wherein a plurality of wearable devices 300 comprising sensor 335/intelligent measuring head 600, as discussed, herein, replace the plurality of conventional adhesive-based strip sensors.

In this illustrated exemplary embodiment, each of the sensors 335 (not shown) may be electrically connected to a corresponding intelligent measuring heads 600, which may be attached to one or more points (referred to as V1, V2 . . . V6) on the human body through a vacuum attachment, for example, of mounting device 600. Each of mounting devices 600 may be identified by an identification code and a positional location, wherein the biological data collected by each of the mounting device 600 may be transmitted to computing system 220 through intelligent measuring head 600, as discussed.

In one aspect of the invention, each of the intelligent measuring heads 600 digitizes and transmits the collected data using one of a BLUETOOTH protocol, a Wi-Fi or cellular network to computing system 220.

Figure 9:
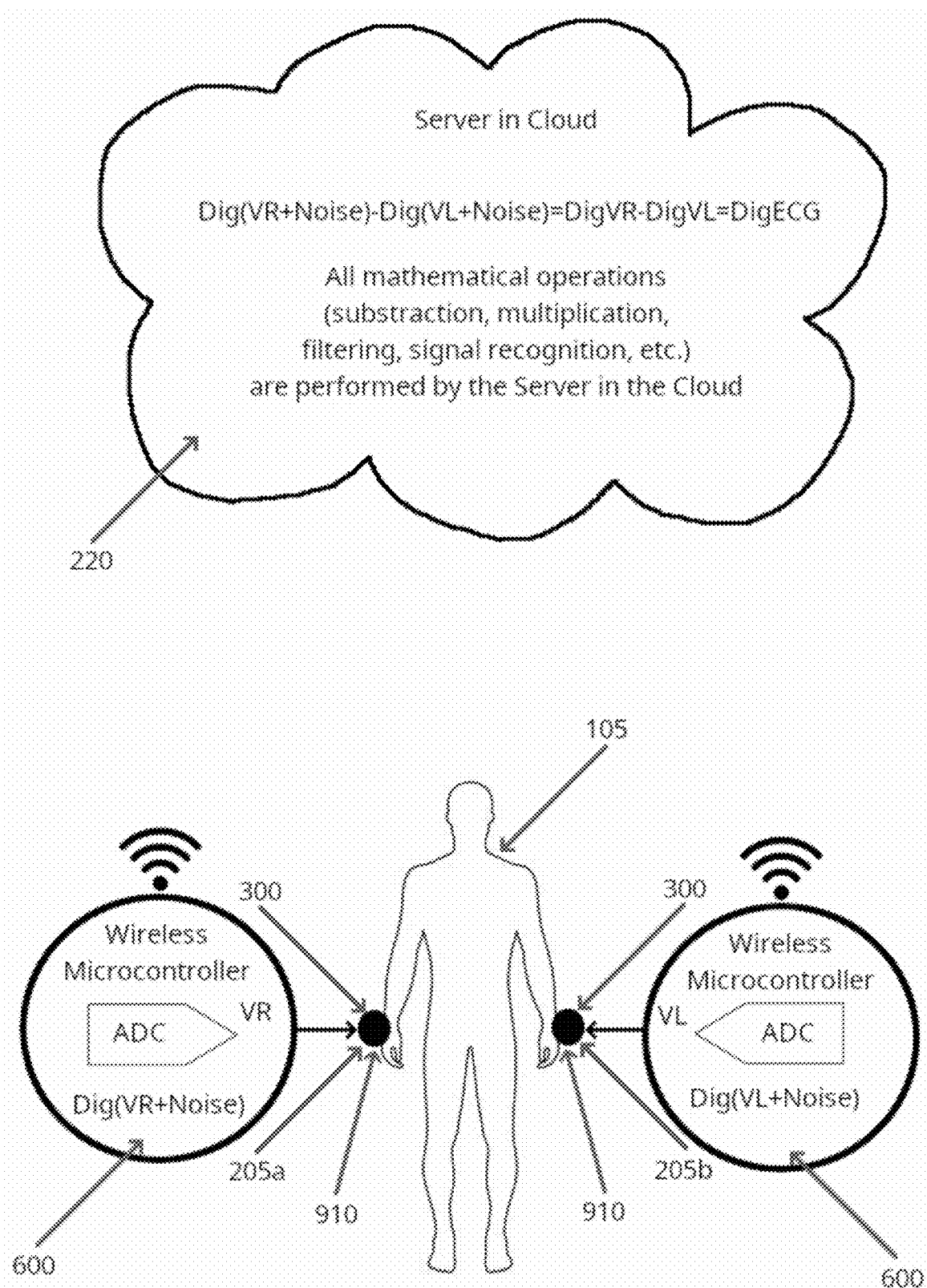
FIG. 9 illustrates a block diagram of an exemplary digital ECG system in accordance with the principles of the invention.

FIG. 9 illustrates a block diagram of an exemplary digital ECG system in accordance with the principles of the invention.

In this illustrate embodiment, wearable devices 300 are attached to right wrist 205*a* and left wrist 205*b*, wherein the intelligent measuring head 600 attached to corresponding ones of wearable devices 300 digitize the received data and transmit the received data to a processing (computing) system 220 to perform the calculations necessary to obtain a digital ECG.

In one aspect of the invention, the data transmitted may include intelligent measuring head 600 identification information that allows for the sorting of the received data by processing system 220. In one aspect of the invention, the data transmitted by monitoring systems 600 may be synchronized such that data associated with left wrist 205*b* is received by processing system 220 at substantially the same time as data associated with right wrist 205*a* (i.e., concurrently or synchronously). In one aspect of the invention, processing system 220 may provide synchronization signals to monitoring system 600 that may be used to synchronize the transmission of obtained data to computing system 220. In another aspect of the invention, the intelligent measuring heads 600 may be preprogrammed (or instructed) to provide collected data to processing system 220 on a timed or periodic basis. For example, at 1-minute intervals, at 2-minute intervals, at 10-minute intervals, etc. In one aspect of the invention, intelligent measuring head 600 may further include a time of data collection, wherein processing unit 220 may sort the received data by identification code (e.g., left/right) and time of data collection in the determination of a digital ECG representation.

In one aspect of the invention, intelligent measuring heads 600 may be color-coded for the convenience of a medical technician in the correct placement of a plurality of intelligent measuring heads 600 on a patient or user 105.

In accordance with the principles of the invention, and as shown in FIG. 9, wearable device 300 may further include a pulse-oximeter 910 used to measure an oxygen level of patient/user 105. Pulse-oximeters are known in the art to measure the oxygen level within the patient/user 105 by the emission of a light (e.g., red, infra-red) toward the skin of the user 105 and measuring the absorption of the light by blood within the patient/user 105. In one aspect of the invention, the pulse-oximeter 910 may be incorporated into retaining band 305 or within sensor 335. Intelligent measuring head 600, after receiving oxygen level information from pulse-oximeter digitizes the received oxygen level information and transmits the digitized information computer system 220. In one aspect of the invention, the digitized pulse oxygenation may be transmitted to computing system 220 independently of, or concurrently with, other biometric data obtained by sensor 335

Computing system 220 in receiving biological data from wearable device 300 and oxygenation information from a pulse-oximeter 910, may automatically determine a digital ECG supplemented by oxygenation levels to determine a pulse curve and, consequently, a blood pressure level.

Many different embodiments have been disclosed herein, in connection with the above description. It will be understood that it would be unduly repetitious and obfuscating to literally describe every combination and subcombination of these embodiments. Accordingly, all embodiments can be combined in any way and/or combination, and the present specification, shall be construed to constitute written description of all combinations and subcombinations of the embodiments described herein, and of the manner and process of making and using them, and shall support claims to any such combination or subcombination.

It will be appreciated by persons skilled in the art that the present embodiment is not limited to what has been particularly described hereinabove. A variety of modifications and variations are possible in light of the above teachings without departing from the following claims.

What is claimed is:

1. A wearable medical device for capturing and collecting data used in performing an electrocardiogram analysis of a patient, said medical device comprising:
an expandable/retractable band comprising:
an electrical contact area positioned on an outer surface of said band;
a sensor, positioned on an inner surface of said band, electrically connected to said contact area, wherein said sensor is retained firmly in contact with a body part of said patient by a retraction of said band to an initial position;
an upper arm;
a lower arm, wherein said upper arm and said lower arm are held in said initial position, wherein said initial position is one of a closed position; and a spring clip configured to:
expand a space between the upper arm and the lower arm into which said body part may be inserted; and
retract said upper arm and said lower arm toward said initial position.

2. The wearable medical device of claim 1, wherein said expandable band is an expandable wristband.

3. The wearable medical device of claim 1, wherein said sensor a capacitive sensor.

4. The wearable medical device of claim 1, wherein said sensor is a strip sensor.

5. The wearable medical device of claim 1, comprising:
a post electrically connected to said contact area.

6. The wearable medical device of claim 1, comprising:
a monitoring module, removably attachable to said band, said monitoring module configured to:
digitize data collected by said sensor; and transmit said digitized data to a processing unit.

7. The wearable medical device of claim 6, wherein said monitor module is magnetically attachable to said band.

8. The wearable medical device of claim 5, comprising:
a wire connection, removably attachable to said post, wherein data collected by said sensor is provided to a monitoring module, said monitoring module configured to:
digitize data collected by said sensor; and transmit said digitized data to a processing unit.

9. A digital electrocardiogram system comprising:
a first wearable device positioned on a left wrist of a patient; and a second wearable device positioned on a right wrist of a patient, wherein each of the first wearable device and the second wearable device comprise an expandable/retractable band comprising:
an electrical contact area positioned on an outer surface of said band;
a sensor, positioned on an inner surface of said band, electrically connected to said contact area, wherein said sensor is retained firmly in contact with a body part of said patient, said sensor configured to:
collect biometric data associated with said patient; and
a monitor module, removably attachable to said electrical contact, configured to:
digitize said biometric data collected by said sensor; and transmit said digitized biometric data to a processing system.

10. The digital electrogram system of claim 9, wherein the processing system is configured to:
receive the transmitted biometric data; sort the received biometric data into left data and right data; and determine an electrocardiogram presentation based on the received left data and right data.

11. The digital electrocardiogram system of claim 9, wherein said digitized data for the first wearable device and the second wearable device is transmitted synchronously.

12. The digital electrocardiogram system of claim 9, wherein said digitized data for the first wearable device and the second wearable device is transmitted periodically.

13. The digital electrocardiogram system wherein the first wearable device and the second wearable devices are one of: a clip/tong type devices and wrist bands.

14. A digital electrocardiogram system comprising:
a sensor attached to each of a plurality of positions; and
an intelligent measuring head associated with each of the plurality of sensors, wherein said intelligent measuring head is removably attachable to said sensor, the intelligent measuring head configured to:
digitize data collected by an associated one of the plurality of sensors; and
transmit the digitized data to a processing system, wherein the transmitted data comprises at least identification information associated with the intelligent measuring head.

15. The digital electrocardiogram system of claim 14, wherein said intelligent measuring head comprises:
 a magnetic base element configured to:
 magnetically attachable to said sensor.

16. The digital electrocardiogram system of claim 14, wherein said intelligent measuring head comprises a flexible base element configured to:
 form a vacuum seal.

17. The digital electrocardiogram system of claim 14, wherein said sensor is a strip sensor.

18. The digital electrocardiogram system of claim 14, wherein said sensor is a capacitive sensor.

19. The digital electrocardiogram system of claim 9, further comprising:
 a pulse-oxygenation meter configured to:
 measure a blood oxygenation level, wherein said monitor module is configured to:
 digitize blood oxygenation level collected by said pulse-oxygenation meter; and transmit said digitized pulse-oxygenation level to said processing system.

20. The digital electrocardiogram system of claim 19, wherein said processing system is configured to:
 determine a blood pressure based on said received data associated with said biometric data and said received pulse-oxygenation data.

\* \* \* \* \*